(No Model.)
A. G. STANTON.
COOKING VESSEL.
No. 342,050. Patented May 18, 1886.
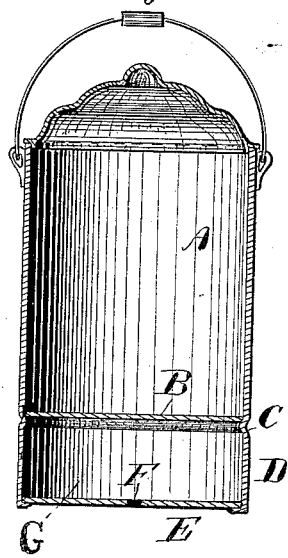
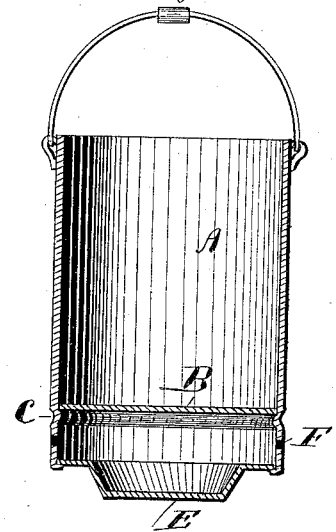
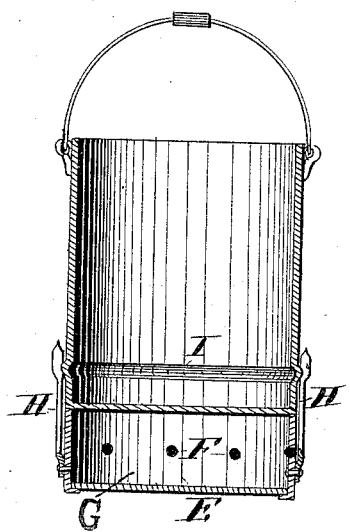
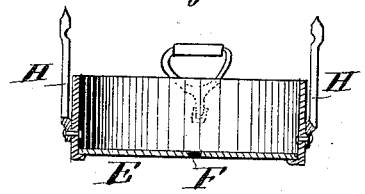
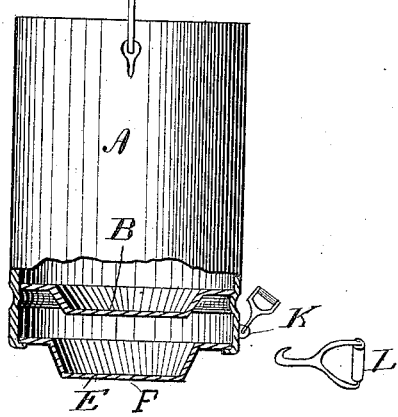
Witnesses
C. W. H. Brown.
M. L. Williams.
Inventor
Albert G. Stanton
By his Attorney
Wallace A. Bartlett

UNITED STATES PATENT OFFICE.

ALBERT G. STANTON, OF SAUGERTIES, NEW YORK.

COOKING-VESSEL.

SPECIFICATION forming part of Letters Patent No. 342,050, dated May 18, 1886.

Application filed December 26, 1885. Serial No. 186,785. (No model.)

*To all whom it may concern:*

Be it known that I, ALBERT G. STANTON, residing at Saugerties, in the county of Ulster and State of New York, have invented certain new and useful Improvements in Cooking-Vessels, of which the following is a specification, reference being had therein to the accompanying drawings.

This invention relates to cooking-vessels; and it consists in a vessel of the construction hereinafter set forth and claimed.

The object of the invention is to produce a vessel in which comestibles may be cooked without liability of burning to the bottom of the dish.

In the drawings, Figure 1 is a vertical section through a cooking-vessel made according to this invention. Fig. 2 is a similar section showing a vessel with bottom to enter the hole in stove-top. Fig. 3 is a section of a modified construction, and Fig. 4 a section of bottom part detached. Fig. 5 is an elevation, partly sectioned, showing vessel with inner bottom corresponding to false bottom, and with an eyelet on the side to receive a detachable handle.

A indicates the body of the vessel, which may be a pot, kettle, pail, or similar utensil, made of sheet or cast metal. B is the bottom of said vessel, which may be made of sheet metal, and is preferably held up by a corrugation, C, passing round the dish near the lower end. That portion D of the sides of the dish which extends below the bottom B forms an air chamber or space, and the bottom E, which comes next the fire or on the top of the stove in cooking, forms a shield which prevents the direct heat from the fire from reaching the bottom B. A hole or holes, F, open communication from the air-chamber G to the external air.

In the modification shown in Figs. 3 and 4 that portion of the body of the vessel below the bottom B is made detachable, and the detachable portion is attached to the main vessel by spring-arms H H, which hook over a ridge or projection, I, on the body of the vessel. Two or more of these spring-arms may be used.

It is not intended that the air-chamber between the two bottoms of the vessel shall contain liquid. In this respect the improved vessel differs from glue-pots and other dishes of the same general character, and as the bottom portion is light no very heavy fastenings are required. The vessel may be provided with a bail, K, or with a handle.

When the false bottom is made to fit a griddle-hole, the imperforate bottom may be offset to be parallel therewith, as in Fig. 5.

Near the bottom of the vessel I preferably place a perforated boss or eye, K', in which a detachable handle, L, may be hooked to assist in handling the vessel. The eye may be a boss cast on a cast-metal vessel, or a loop soldered to one having a sheet-metal body.

I am aware that cooking-vessels have been made in which there was a perforated false bottom or base containing a lamp or similar heating apparatus; also that removable bottoms are not new in cooking utensils.

I claim—

1. A domestic cooking-vessel having a bail or handle attached to the cylindrical body, which is of thin metal, and has an imperforate bottom permanently secured in the cylindrical portion, a little above the lower end thereof, and a false bottom with open perforations, which serves as a shield, said false bottom being at the lower end of the cylindrical portion, and the space between said bottoms being vacant, substantially as described.

2. A domestic cooking-vessel having the usual bail or handle, a cylindrical body of thin metal, an offset imperforate bottom secured in the cylinder a little above the base, and a false bottom, offset to fit a griddle-hole, attached to the bottom of the cylindrical portion of the vessel, the space between the bottoms being vacant, and having a ventilating-opening, substantially as described.

In testimony whereof I affix my signature in presence of two witnesses.

ALBERT G. STANTON.

Witnesses:
THOS. B. KEENEY,
JOHN M. MYER.